US012770173B2

(12) United States Patent
Raiskin et al.

(10) Patent No.: US 12,770,173 B2
(45) Date of Patent: Oct. 20, 2026

(54) ITEM EMBEDDINGS FOR MACHINE LEARNING SYSTEMS

(71) Applicant: PayPal, Inc., San Jose, CA (US)

(72) Inventors: Yarden Raiskin, Petah Tikva (IL); Yuval Yaron, Tel Aviv (IL)

(73) Assignee: PayPal, Inc., San Jose, CA (US)

(*) Notice: Subject to any disclaimer, the term of this patent is extended or adjusted under 35 U.S.C. 154(b) by 239 days.

(21) Appl. No.: 18/055,524

(22) Filed: Nov. 15, 2022

(65) Prior Publication Data

US 2024/0161164 A1 May 16, 2024

(51) Int. Cl.
*G06Q 30/06* (2023.01)
*G06Q 30/0601* (2023.01)

(52) U.S. Cl.
CPC ..... *G06Q 30/0631* (2013.01); *G06Q 30/0629* (2013.01)

(58) Field of Classification Search
CPC ........... G06Q 30/0631; G06Q 30/0629; G06Q 30/06311; G06Q 30/06312; G06Q 30/06313; G06Q 30/06314
USPC .......................................................... 705/26.7
See application file for complete search history.

(56) References Cited

U.S. PATENT DOCUMENTS

| | | | | |
|---|---|---|---|---|
| 8,024,344 | B2 * | 9/2011 | Bradford | G06F 21/6254 707/750 |
| 9,514,404 | B1 | 12/2016 | Corrado et al. | |
| 9,659,560 | B2 | 5/2017 | Cao et al. | |
| 10,922,393 | B2 * | 2/2021 | Spizhevoy | H04L 63/0861 |
| 11,416,910 | B1 * | 8/2022 | Bazzani | G06Q 30/0643 |
| 2004/0039657 | A1 * | 2/2004 | Behrens | G06F 16/3347 707/E17.08 |
| 2006/0112098 | A1 * | 5/2006 | Renshaw | G06F 16/639 |

(Continued)

FOREIGN PATENT DOCUMENTS

EP 3992892 A1 * 5/2022 ....... G06F 16/24578

OTHER PUBLICATIONS

Chen, Jiangmei; Zhang, Wende; Zhang, Qishan ; "Enhancing rating prediction for recommendation by metric learning with gray relational analysis"; Grey Systems12.3: 635-650. Emerald Group Publishing Limited. (2022), retrieved on Nov. 26, 2024 (Year: 2022).*

(Continued)

*Primary Examiner* — Yogesh C Garg
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to item representations. A computer system may access information identifying a first set of items and generate a representation of the first set of items that positions them in an embedding space. The computer system may send a request to another computer system for information pertaining to an item selected from the first set of items and receive correlation information that identifies recorded user behavior indicative of correlations between a second set of items and the selected item. The computer system may update the representation based on the correlation information, such that at least one of the first set of items that is included in the second set is moved closer to the selected item in the embedding space and at least one of the first set of items that is not included in the second set is moved farther away from the selected item.

16 Claims, 7 Drawing Sheets

(56) References Cited

U.S. PATENT DOCUMENTS

| | | | | |
|---|---|---|---|---|
| 2016/0180151 | A1 | 6/2016 | Philbin et al. | |
| 2020/0311542 | A1* | 10/2020 | Wang | G06F 16/245 |
| 2022/0230205 | A1* | 7/2022 | Taifi | G06N 20/00 |
| 2022/0270155 | A1* | 8/2022 | Volkovs | G06N 3/08 |
| 2023/0138579 | A1* | 5/2023 | Barkan | G06Q 30/0631<br>707/732 |
| 2023/0169361 | A1* | 6/2023 | Mitra | G06N 3/006<br>706/12 |
| 2023/0376835 | A1* | 11/2023 | Malkiel | G06N 3/0895 |

OTHER PUBLICATIONS

Cheng-Te Li et al. " FairSR: Fairness-aware Sequential Recommendation through Multi-Task Learning with Preference Graph Embeddings"; arXiv:2205.00313v1 [cs.IR] Apr. 30, 2022 retrieved from IP. Com on Jan. 28, 2026 (Year: 2022).*

* cited by examiner

ITEM EMBEDDINGS FOR MACHINE LEARNING SYSTEMS

BACKGROUND

Technical Field

This disclosure relates generally to computer systems and, more specifically, to various mechanisms for leveraging recorded user behavior to improve item representations.

Description of the Related Art

Companies often provide services that rely on accurate descriptions and representations of items/entities (e.g., websites, merchants, etc.) in order to implement particular functionality. With accurate descriptions and representations of items, a system may be able to identify items that are related or share certain correlations and thus can be grouped together into a common group. Items that are grouped can be acted upon or treated in similar manners. As an example, based on their descriptions and representations, a first website may be grouped with a second website known to be a security risk. Consequently, a system may protect users from interacting with the first website based on it being grouped with the second website. As another example, these groupings can be used to provide recommendations to users about other entities that may be related to those that the users are viewing.

DETAILED DESCRIPTION

Figure 1:
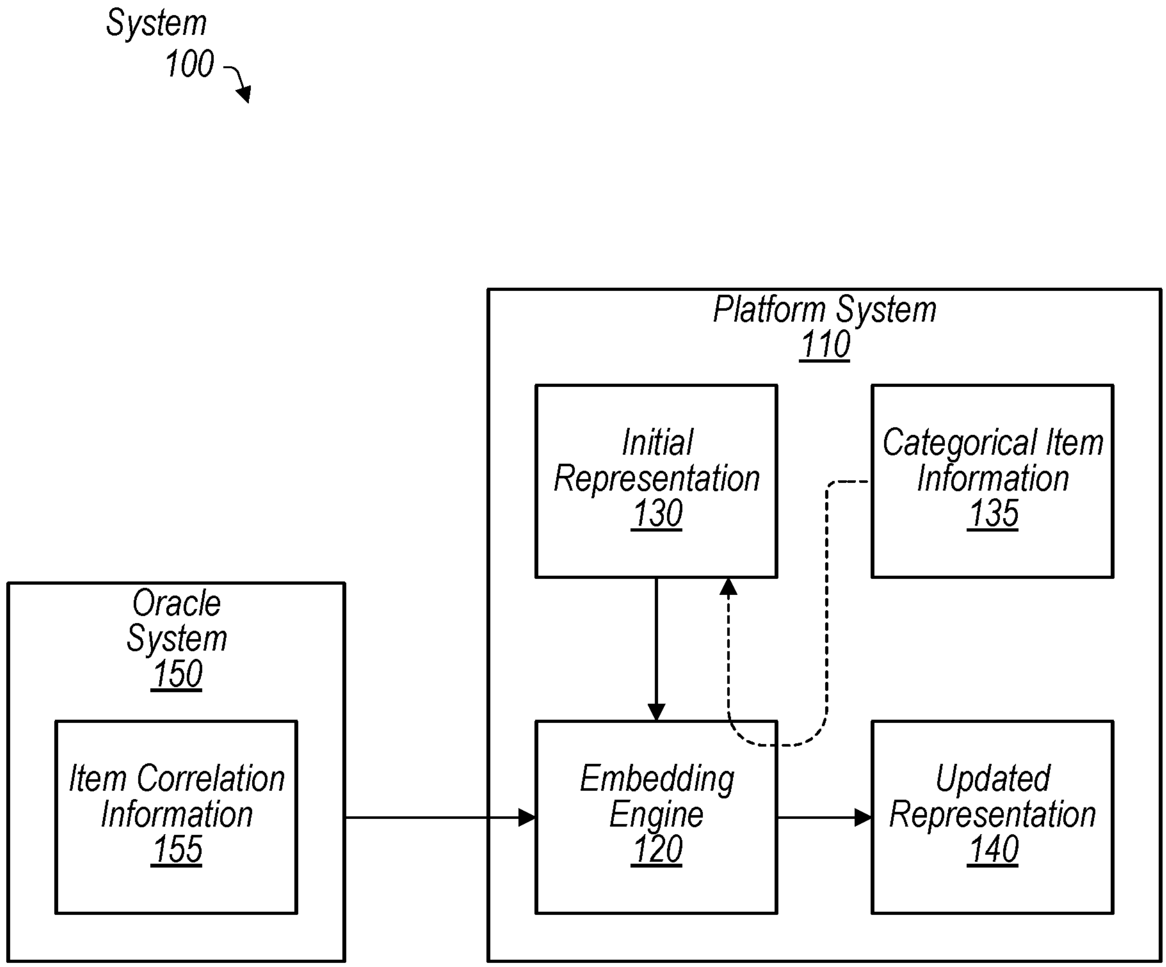
FIG. 1 is a block diagram illustrating example elements of a system having a computer system that includes an embedding engine that can generate and update item representations, according to some embodiments.

In many cases, services rely on accurate representations of items in order to implement their functionality. As used herein, the term "item" is used to refer to anything (whether tangible or intangible) that may be tracked by a software service. Accordingly, an "item" can refer to an entity, a place (whether real or virtual), a thing, an activity, an attribute, etc. Thus, a merchant, a restaurant, a historical site, a piece of virtual real estate, a website, a marathon event, a customer review, are all examples of items under the broad definition of that term used in this disclosure. Item representations of items can be generated using a machine learning model that embeds the items into an embedding space (e.g., a vector space) as embeddings. Such item representations can be generated using descriptive categorical data that is often provided by the overseers of those corresponding items. For example, when describing itself, a merchant (a type of item) may provide categorical data such as a merchant description, website data, an address, open hours, products, etc. That categorical data is used in conjunction with a machine learning model to produce an item representation of the merchant.

However, an item representation does not always represent the real-world perception of an item by its users (and others), nor does it necessarily reflect the "real life" similarity between the item and different items. For example, the open hours and the item descriptions for a theme park and a restaurant within that theme park may produce item representations that indicate that those items are not related despite them being related by the fact that the restaurant is located within that theme park. Moreover, the categorical data provided for an item does not always correctly describe that item and thus can lead to inaccurate item representations. Item representations that do not provide an accurate reflection of the correlations between particular items (e.g., a set of items are similar) can be detrimental to the operations of particular services or machine learning applications that utilize the item representations. For example, if two items are similar and associated with the same risk, but their item representations are dissimilar, then a machine learning model may be trained incorrectly or provide an incorrect assessment of the risk of one of the items. In the case of a security risk, the incorrect assessment of the risk may lead to a breach of a particular system as the corresponding item may be assessed as a non-risk despite being malicious. This disclosure addresses, among other things, the problem of how to create item representations that are more indicative of the correlations between items.

In various embodiments described below, a system leverages correlation information that identifies recorded user behavior relating to a set of items to create item representations of those items that may be indicative of the correlations between them. As used herein, the phrase "recorded user behavior" refers to information describing a user's interactions or activities in relation to items. For example, a user searching for a car might utilize a search engine to locate websites that sell the car. The user's interactions with the search engine (i.e., the user's search requests) can be recorded by that search engine as recorded user behavior. As another example, a user may travel between different physical sites and their resulting Global Positioning System (GPS) data can be stored as recorded user behavior. Recorded user behavior stands in contract to categorical data that describes characteristics/properties of items that are not derived from user behavior. For example, the categorical data for a table and a chair could describe their material, their dimensions, their weight, etc., while recorded user behavior could indicate that, when a user bought the chair, the user also bought the table.

A computer system may initially access item information identifying a first set of items (e.g., a list of merchants). In some embodiments, the computer system creates a representation of those items that positions them in an embedding space—e.g., a set of embeddings in a vector space. This initial representation may be created using categorical data of the items. In various embodiments, the computer system issues, to a different computer system (that can be referred to as the "oracle" computer system), a set of requests for information pertaining to the first set of items. The oracle computer system returns correlation information that identifies, for a given one of the first set of items, recorded user behavior that is indicative of correlations between a second set of items and the given item.

A search engine is an example oracle computer system that might identify the second set of items (e.g., other merchants) as items for which users also searched when searching for the given item (e.g., a certain merchant). Based on the correlation information, in various embodiments, the computer system modifies the initial representation such that the given item is moved, in the embedding space, closer to items of the first set that are included in the second set and farther away from items of the first set that are not included in the second set. The computer system may perform the steps of querying the oracle computer system and then modifying the representation for each item of the first set of items. In various embodiments, the computer system then calculates distances between items in the embedding space. If the distance between two items is "short," then those two items may be deemed similar and thus one of those items may be recommended to users as an alternative to the other "close" item.

These techniques may be advantageous over prior approaches as these techniques allow for item representations to be created that are more reflective of how items are viewed by users. That is, these techniques leverage apparent user preferences (which can be obtained from one or more oracle systems) and thus relations between items can be derived from observed user behavior and are not restricted to only categories, industries, or artificially imposed descriptive features. Since observed user behavior reflects user preferences in a more substantial way than item-provided descriptive data does, it can be used to more accurately represent the perception of items by users. This stands in contrast to an approach in which only categorical data is used to generate item representations; those item representations not being reflective of the real-life similarities between different items. Moreover, since recorded user behavior may be obtained from an oracle system that interacts with millions of users, that information may be less prone to error (i.e., being incorrect) and more complete than categorical data provided by an overseer of an item—e.g., the overseer may provide categorical data that is incomplete, incorrect, and has typographical errors. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a platform system 110 and an oracle system 150. As shown, platform system 110 includes an embedding engine 120, an initial representation 130, categorical item information 135, and an updated representation 140. As further shown, oracle system 150 includes item correlation information 155. In some embodiments, system 100 is implemented differently than shown. As an example, categorical item information 135 may be stored by another computer system that is external to and distinct from (e.g., operated by another entity) platform system 110.

Platform system 110, in various embodiments, implements a platform service, such as a payment service or a customer relationship management service, that provides functionality accessible to users of that service. In some embodiments, platform system 110 is implemented using a cloud infrastructure provided by a cloud provider. Accordingly, embedding engine 120 may execute on and use the available cloud resources of the cloud infrastructure (e.g., storage resources, network resources, etc.) to facilitate its operations. For example, embedding engine 120 may execute in a virtual environment hosted on server-based hardware that is included in a data center of a cloud provider. But in some embodiments, platform system is implemented using a local or private infrastructure as opposed to a public cloud.

One example service that may be provided by platform system 110 is a payment service that facilitates interactions (e.g., product exploration, transactions, etc.) between merchants and customers. As a part of facilitating those interactions, platform system 110 may perform certain actions (e.g., risk assessment, lead generation, etc.) that are assisted by machine learning (ML) models. In many cases, the ML models utilize merchant or customer representations (e.g., ML embeddings) to produce their outputs and thus better representations may lead to better outputs from the ML models. Another example service that may be provided by platform system 110 is a web mapping service that provides maps of physical locations (e.g., a map of a city) and/or maps of computer networks, such as the Internet. Having representations of the locations (e.g., physical sites, websites, etc.) may allow for platform system 110 to identify locations that have similar characteristics. To generate representations of items (e.g., merchants and locations), in various embodiments, platform system 110 utilizes embedding engine 120.

Embedding engine 120, in various embodiments, is software that is executable to create representations 130 and 140 having embeddings of items embedded into an embedding space (e.g., a vector space). In various embodiments, embedding engine 120 initially generates initial representation 130 for a set of items and then updates it based on item correlation information 155 obtained from oracle system 150 to produce updated representation 140. As discussed in more detail with respect to FIG. 2, embedding engine 120 may use an ML model to embed the set of items into the embedding space as item embeddings. That embedding can be performed based on categorical item information 135 when generating initial representation 130. As part of updating initial representation 130, in various embodiments, embedding engine 120 updates those item embeddings based on item correlation information 155 such that certain embeddings are moved closer to each other within the embedding space and certain embeddings are moved farther away from each other. As discussed in greater detail with respect to FIG. 5, the positions of item embeddings within the embedding space of updated representation 140 may be used to facilitate functionality of a service provided by platform system 110 (e.g., to identify merchants that are similar).

Initial representation 130, in various embodiments, is a data structure that comprises or defines an embedding space that includes item embeddings corresponding to a set of items that are embedded in that embedding space. Initial representation 130 (and updated representations 140) may be stored as a key-value structure in which an item's name/identifier serves as a key usable to access the item's embedding, which is the value. The set of items used in the creation of initial representation 130 may be specified by a user or derived from data (e.g., a list) stored in a database of platform system 110 or an external system. For example, platform system 110 may provide a service that involves a particular set of items (e.g., a set of merchants that utilize platform system 110). Accordingly, embedding engine 120 may access information identifying the particular set of items and then create initial representation 130 based on that particular set of items. In some embodiments, items in initial representation 130 are randomly positioned in the embedding space by embedding engine 120, but in other embodiments, their positioning is determined using categorical item information 135.

Categorical item information 135, in various embodiments, is information describing a set of properties of items that is not derived from user behavior. Categorical item information 135 may be supplied by a user of platform system 110 and/or by entities connected to the items identified in categorical item information 135. For example, a public park may have its precise geographical coordinates provided by an operator of platform system 110 and its opening hours provided by a third party, such as a user or a government entity that may manage that park. As another example, categorical item information 135 may identify the category to which a given item of categorical item information 135 belongs. When creating initial representation 130, in some embodiments, embedding engine 120 accesses categorical item information 135 and then uses it to determine the initial embeddings of the items. Categorical item information 135 may also be used (with item correlation information 155) during the update of initial representation 130.

While categorical item information 135 may be useful in creating initial representation 130, it may not accurately present the "real-life" relations between the different items in initial representation 130, as previously discussed. Accordingly, it is desirable to use information that provides a more objective representation of the different items in initial representation 130. In the context of merchants for example, information derived from users' behavior may be more reflective of users' preferences and beliefs about merchants than information provided by those merchants. This information may be obtained from third-party entities (e.g., oracle system 150) with which users interact.

Oracle system 150, in various embodiments, is a system that observes and records user behavior that pertains to a set of items. For example, oracle system 150 may be a search engine that receives and records search queries from various users. Those search queries are indicative of user behavior and may be used to identify correlations between items. For example, if a user searches for a certain item (e.g., a seller), then subsequent searches for other items (e.g., sellers) may imply that all the items are related (e.g., the sellers sell the same type of good). In various embodiments, item correlation information 155 is determined from recorded user behavior and is indicative of correlations between items. Continuing the previous example, the search engine may store item correlation information 155 that indicates, when users searched for a particular item, they also searched for these particular other items. Oracle system 150 may different than a search engine. For example, oracle system 150 might be a system that collects GPS data from user devices of a group of users. Oracle system 150 may not have any internal representations or understandings of the particular items for which it stores statistical knowledge. Continuing the prior example, while the system collects GPS data, it does not know that particular locations (the items) visited by the group of users are related. As such, in various embodiments, platform 110 derives item correlation information 155 from user behavior data (e.g., GPS data) obtained from oracle system 150.

After generating initial representation 130, in various embodiments, embedding engine 120 issues a request to oracle system 150 for item correlation information 155 pertaining to a set of items. In some cases, embedding engine 120 may issue a request for each item and receive item correlation information 155 pertaining to that item. Embedding engine 120 may then update initial representation 130 based on item correlation information 155 to produce updated representation 140. Examples of the types of information that may be collected by oracle system 150 and then used to create item correlation information are discussed in greater detail with respect to FIG. 3.

Updated representation 140, in various embodiments, is an updated version of initial representation 130 whose embeddings have been updated by embedding engine 120 using item correlation information 155. As discussed in greater detail with respect to FIG. 3, embedding engine 120 may execute a set of algorithms that update item embeddings such that a given item embeddings is positioned closer to items identified in its item correlation information 155 and positioned farther away from one or more items in the embedding space that are not identified in its item correlation information 155. In many cases, item embeddings can be used to measure similarity: if two items have embeddings that are relatively close in the embedding space, then these items can be similar. As an example, an updated representation 140 of a set of merchants may be used to determine merchants that sell similar goods, and the merchants whose distances are closest to each other in the embedded space may be recommended to a given user as similar merchants.

Figure 2:
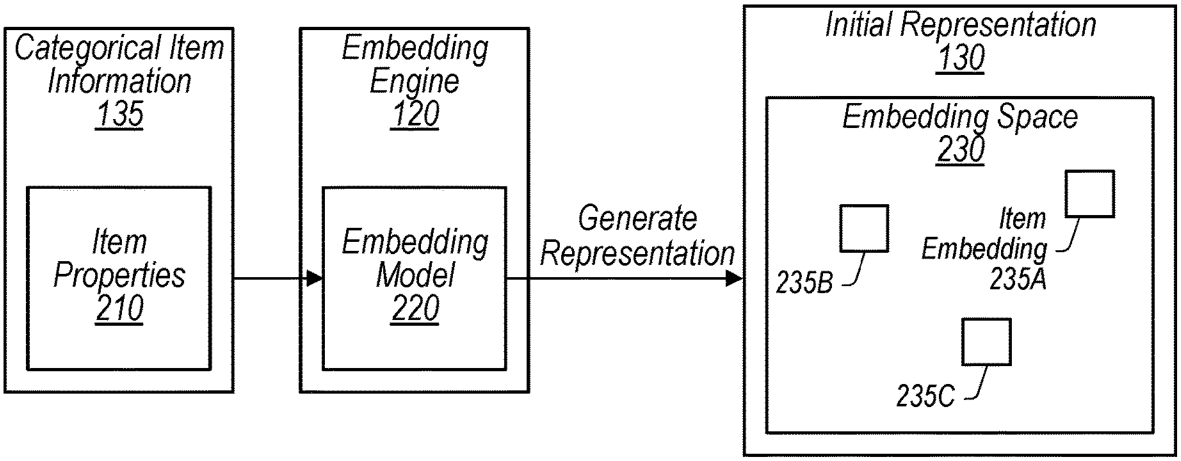
FIG. 2 is a block diagram illustrating an example embedding engine creating an initial representation of items in an embedding space, according to some embodiments.

Turning now to FIG. 2, a block diagram of an example embedding engine 120 creating an initial representation 130 of items in an embedding space 230 is depicted. In the illustrated embodiment, there is categorical item information 135, embedding engine 120, and initial representation 130. Also as shown, categorical item information 135 includes item properties 210, embedding engine 120 includes an embedding model 220, and initial representation 130 includes embedding space 230 having item embeddings 235A-C. The illustrated embodiment may be implemented differently than shown—e.g., embedding engine 120 may generate initial representation 130 without using categorical item information 135.

As explained, embedding engine 120 may access categorical item information 135 and use it to create initial representation 130. In particular, item properties 210 of the items that are specified in categorical item information 135 may be used as input into embedding model 220 to generate item embeddings 235 in embedding space 230. An item embedding 235, in various embodiments, is an n-dimensional vector that represents an item. Each dimension of the vector may correspond to an item property 210 (e.g., the type of merchant), and the vector may include a numerical value for that dimension that is indicative of an item's value for that item property 210—an example is provided further below. Accordingly, for each item that will be embedded, categorical item information 135 may provide a description of that item for each item property 210 used in the embedding. As an example, item properties 210 for merchants may be the type of merchant, the merchant's opening hours, and their products. Consequently, categorical item information 135 may specify, for a given merchant, values for those item properties 210. Item properties 210 may be stored in any appropriate file or data structure that permits the selection of individual items and their related properties (e.g., JSON). As discussed, item properties 210 may be stored at platform system 110 or transferred from another computer system in the form of a request or a file download. In other embodiments, item properties 210 are generated from platform system 110 using categorical item information 135 submitted by third parties.

Embedding model 220, in various embodiments, is a machine learning model that can be used to generate an item embedding 235 that positions a corresponding item in embedding space 230. Embedding model 220 may use information from categorical item information 135 to extract items (e.g., their values for item properties 210) and accordingly generate embedding space 230 in which those items are embedded. To generate an item embedding 235 for an item, in some embodiments, embedding engine 120 uses embedding model 220 to convert the item's values for item properties 210 into a vector. For example, the first dimension of the vector may correspond to the type of item, and each type may be assigned a different value within a range.

Using websites as an item example, sports websites may be assigned a value of "1" and movie websites may be assigned a value of "2." As such, for a website that is categorized as a movie website, embedding engine 120 may generate the website's vector such that the first dimension of the vector stores the value "2." As another example, categorical item information 135 may identify the locations of restaurants (in the case that the items being embedded are restaurants). Accordingly, embedding model 220 may generate, using embedding model 220, a dimension of a restaurant's vector based on that restaurant's distance from a selected point (e.g., a tourist attraction). Embedding model 220 may be created by a user of platform system 110 to fulfill certain criteria sought by the user. In some embodiments, embedding items 235 are generated such that items are randomly positioned in embedding space 230.

Embedding space 230, in various embodiments, is a vector space in which items can be embedded. The vector space may be comprised of one-dimension: a one-dimensional vector space allows for embedding of items with respect to a single item property 210. For example, embedding space 230 may be a one-dimensional vector space in which an item's embedding is dependent on a degree of correlation to a particular item. Following the example, embedding model 220 may embed items on a one-dimensional vector embedding space 230 by calculating the correlations between the items using values of an item property 210. In some embodiments, embedding space 230 is a multidimensional vector space in which items are embedded based on more than one item property 210—e.g., item embeddings 235A-C might be positioned in a two-dimensional vector space. Such embedding spaces may be used to compare items across multiple information categories. Initial representations 130 and embedding space 230 may be stored in any format suitable for maintaining relevant information and accessible to embedding engine 120. Once initial representation 130 is generated, embedding engine 120 may proceed to access correlation information 155 from an oracle system 150, as discussed in FIG. 3.

Figure 3:
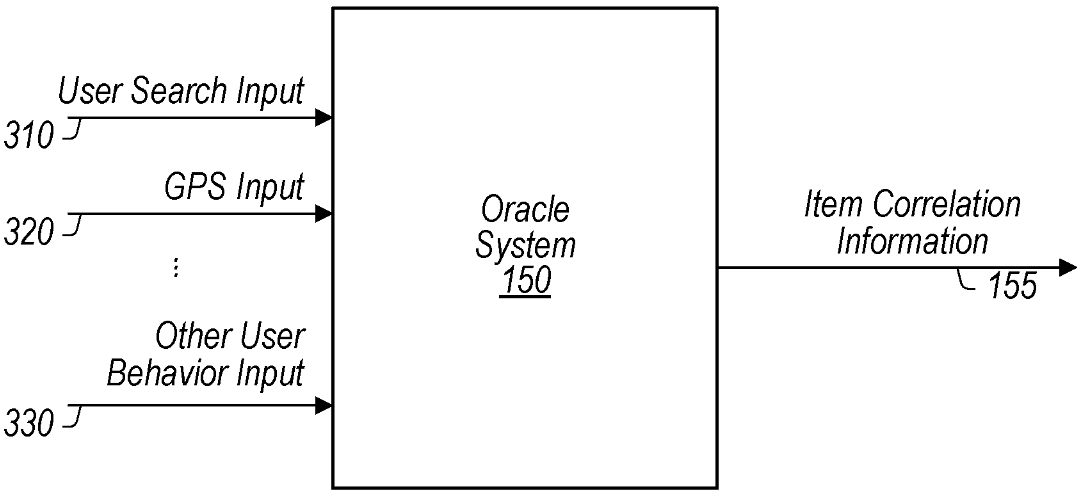
FIG. 3 is a block diagram illustrating an example oracle system outputting correlation information based on a set of inputs, according to some embodiments.

Turning now to FIG. 3, a block diagram of an example oracle system 150 is shown. In the illustrated embodiment, oracle system 150 receives user search input 310, GPS input 320, and other user behavior input 330 and outputs item correlation information 155. Oracle system 150 may be a website or a service accessible to platform system 110. But in other embodiments, oracle system 150 is a part of platform system 110 and thus the user behavior being captured and processed may be from platform system 110's own users. The illustrated embodiment may be implemented differently than shown. For example, there might be multiple oracle systems 150 that each receive a respective one of inputs 310-330.

Inputs 310-330, in various embodiments, are inputs that are indicative of user behavior or preference and may be used to generate information that provides other insights that are not provided by categorical item information 135. As an example, data generated from user inputs, such as search queries, can be a far better indicator of the popularity of a particular item among users than information provided by an overseer of that item. As such, this distinction highlights that inferences made from item correlation information 155 can be qualitatively different than those made from categorical item information 135.

Search input 310, in various embodiments, includes information that is extracted from user search behavior that can correlate to searching for a specific term. In some cases, such behavior may be searching for correlated items during the same search session. For example, if a user searches for a specific car, then they may also search for cars of similar make or type. GPS input 320, in various embodiments, is a series of collected coordinates for various locations that are visited in one or more trips. GPU input 320 can indicate a geographic relationship between two locations (e.g., a restaurant and tourist site), as related locations may be visited by the same user in the same trip. Other user behavior input 330, in various embodiments, corresponds to other user input that may be used in oracle system 150, such as flagging of suspicious webpages by users as potentially fraudulent or dangerous. Accordingly, various interactions between a user and oracle system 150 may be construed as a user input and the metrics derived from those interactions can be considered as relevant to determining item correlation. That variety of user inputs may encourage the possible usage of multiple oracle systems 150, as using multiple standards for item correlation may paint a more complete picture of the items being embedded.

It may be useful to find correlations between items according to two or more properties instead of a single property. In some embodiments, multiple oracle systems 150 may be used, with each outputting item correlation information 155 relating to a specific correlation. As an example, multiple correlation information results can be combined to determine whether one or more websites poses security risks: a search engine (a first oracle system 150) may be used to output a set of websites that users tend to associate in search results, while a security website (a second oracle system 150) may be used to output the frequency of user security complaints (e.g., phishing, scam) related to these associated websites. If a given website is determined to be similar in visiting patterns to other websites that users deem a security risk, then the website itself may likely pose security risks and users would benefit from being notified of the potential risk. Thus, in various embodiments, both user patterns and security complaints are user-related correlation information that websites operators cannot reliably provide.

As discussed, oracle system 150 can generate item correlation information 155 based on one or more of inputs 310-330 and provide item correlation information 155 to embedding engine 120 in response to a set of requests. For example, embedding engine 120 may provide a search request to oracle system 150 for a certain item and oracle system 150 may return item correlation information 155 that identifies a set of other items for which users also searched. Item correlation information 155 may then be used by embedding engine 120 to update initial representation 130 to produce updated representation 140, as shown in FIG. 4.

Figure 4:
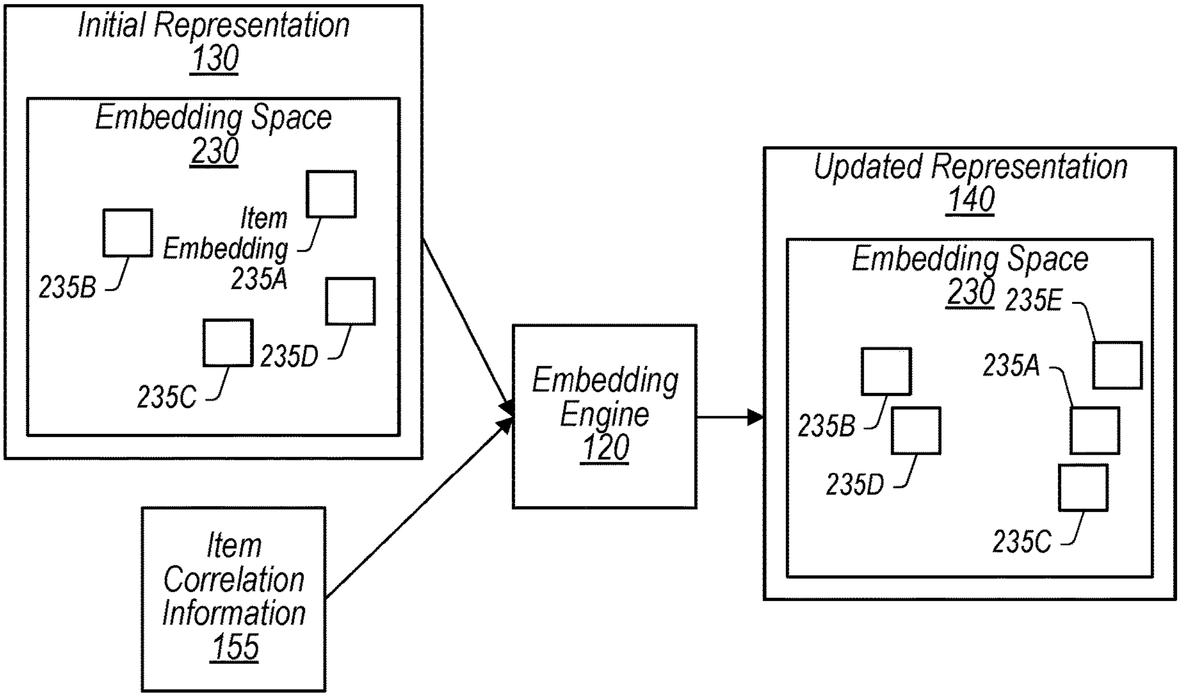
FIG. 4 is a block diagram illustrating an example embedding engine updating an item representation based on item correlation information, according to some embodiments.

Turning now to FIG. 4, a block diagram of embedding engine 120 updating an example initial representation 130 based on item correlation information 155 is shown. In the illustrated embodiment, there is embedding engine 120, initial representation 130, updated representation 140, and item correlation information 155. Also as shown, initial representation 130 includes an embedding space 230 having item embeddings 235A-D, while updated representation 140 includes the same embedding space 230 but item embeddings 235A-D have been adjusted. The illustrated embodiment may be implemented differently than shown. For example, embedding engine 120 may receive separate sets of item correlation information 155 from different oracle systems 150.

To update initial representation 130, in some embodiments, embedding engine 120 uses a machine learning-related algorithm to update item embeddings 235A-D based on information from item correlation information 155. Embedding engine 120 may use a triplet loss function to update item embeddings 235. In a given iteration of the triplet loss function, a baseline item (also called an anchor), a positive item, and a negative item are selected. The distance between the anchor and the positive item within embedding space 230 is decreased, while the distance between the anchor and the negative item is increased. Altering the distance between two item embeddings 235 may include moving one or both of those item embeddings 235. For example, decreasing the distance between the anchor and the positive item may involve moving only the positive item towards the anchor. In other cases, the anchor may be moved or both the anchor and the positive item may be moved towards one another—likewise for the negative item and the anchor.

As discussed, item correlation information 155 may identify a set of items that is similar to an input item. In various embodiments, embedding engine 120 selects an item as an anchor and provides it as an input to oracle system 150 that accordingly outputs a set of items that is correlated to the anchor. Since the items in item correlation information 155 are correlated to the anchor, they may be selected as positive items in a triplet loss function. Conversely, items not present in the anchor's item correlation information 155 may be selected as negative items in that triplet loss function, as their absence from item correlation information 155 implies that they are not correlated to the anchor.

In various embodiments, embedding engine 120 performs one or more iterations of the triplet loss function to item embeddings 235A-D. When performing a given iteration, in various embodiments, embedding engine 120 selects an item embedding 235 from embeddings 235A-D as an anchor and then selects a positive item embedding 235 that corresponds to one of item embeddings 235A-D identified by the anchor's item correlation information 155 and a negative item embedding 235 that corresponds to one of item embeddings 235A-D not identified by the anchor's item correlation information 155. The distance between the anchor item embedding 235 and the positive item embedding 235 is decreased, while the distance between the anchor item embedding 235 and the negative positive item embedding 235 is increased. For example, in one iteration of the triplet loss function, item embedding 235B may be selected as the anchor item embedding 235, item embedding 235D might be selected as the positive item embedding 235, and item embedding 235C might be selected as the negative item embedding 235 for that iteration. As illustrated between initial representation 130 and updated representation 140, item embedding 235D has been moved closer to item embedding 235B while item embedding 235C has been moved farther away.

Multiple iterations of the triplet loss function may be conducted by embedding engine 120 for a given item embedding 235 that is selected as an anchor. For each iteration, embedding engine 120 may select a new positive item embedding 235 (or reuse a positive item embedding 235 from a previous iteration), a new negative item embedding 235 (or reuse a negative item embedding 235 from a previous iteration), or both. Continuing the earlier example, after using item embedding 235D as a positive and item embedding 235C as a negative, embedding engine 120 may select item embedding 235D as a positive again and choose a new negative (e.g., item embedding 235A if it is not identified in the item correlation information 155 that corresponds to item embedding 235B). After performing multiple iterations for a certain anchor, embedding engine 120 may select another item embedding 235 as the anchor and then select positive and negative item embeddings 235 based on its item correlation information 155. After performing the iterations, correlations may be inferred about the items based on the distance between their item embeddings 235. For example, items of item embeddings 235A and 235C may be deemed correlated as those embeddings are close to each other in embedding space 230, while items of item embeddings 235A and 235B are, conversely, less correlated to each other. This property may be used to identify clusters of items in embedding space 230 that are indicative of similar items, as is discussed in FIG. 5.

Item correlation information 155 might include items that are not in the initial embedding space 230. In that case, embedding engine 120 may embed new items in embedding space 230 (e.g., item embedding 235E). In addition to embedding the new items into embedding space 230, in some embodiments, embedding engine 120 may use their corresponding item embeddings 235 as positives and/or negatives when applying the triplet loss function to items embeddings 235 of embedding space 230.

Figure 5:
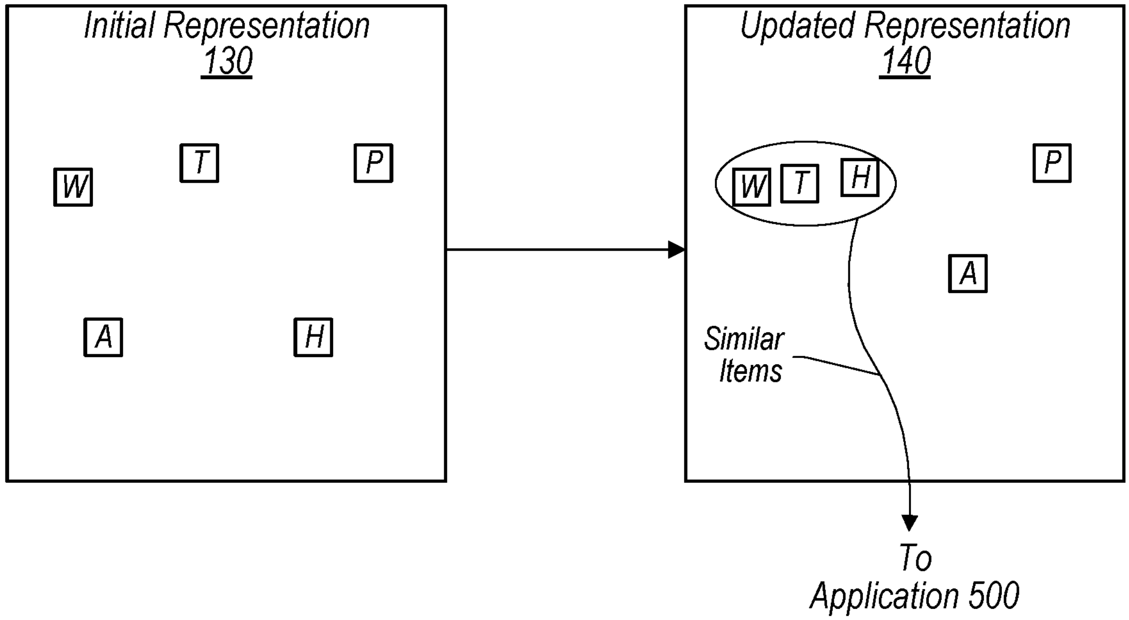
FIG. 5 is a block illustrating an example item representation that is updated and used to output results to an application, according to some embodiments.

Turning now to FIG. 5, a block diagram of an example item representation 130/140 that is updated and used to output a result identifying a set of similar items to an application 500 is shown. In the illustrated embodiment, representation 130/140 includes five item embeddings 235 that correspond to merchants "W," "T," "P," "H," and "A." The illustrated embodiment may be implemented differently than shown. For example, representation 130/140 may include item embeddings 235 that correspond to a different type of item, such as computer systems on a network.

Application 500, in various embodiments, is an application (e.g., a security application, a risk assessment application, etc.) that is capable of communicating with platform system 110 to facilitate a portion or all of its or platform system 110's functionality. In some embodiments, application 500 is executed by platform system 110—application 500 and platform system 110 may be operated by the same entity. But in other embodiments, application 500 is executed on a separate, distinct system that is operated by another entity and it may interact with platform system 110 as a client in a client-server setup. Application 500 may send requests to platform system 110, using a communication protocol (e.g., HTTP), to invoke API functions of platform system 110, and similarly receive information from platform system 110, such as a result that identifies a set of similar items.

After producing updated representation 140, platform system 110 may receive a request from application 500 to identify a set of items that are similar to a particular item. Accordingly, in various embodiments, platform system 110 attempts to select a set of similar items based on their distance being below a certain distance threshold from the particular item. In some cases, the request from application 500 does not identify the particular item. Instead, platform system 110 analyzes updated representation 140 to identify clusters of item embeddings 235 and then returns information specifies the clusters.

As discussed, item embeddings 235 whose distances from each other are below a certain threshold may indicate that their corresponding items are correlated. The selection of items may be performed using the distances that are outputted from a function or formula that determines distance in a vector space, such as a Euclidean distance formula. In the illustrated embodiment, "H," "W," "T," "P," and "A" might correspond to "H-E-B®," "Walmart®," "Target®," "PayPal®," and "Amazon®." Application 500 might seek to identify items similar to Walmart and issue a corresponding request to platform system 110. Platform system 110 may determine, based on their distances from the item embedding 235 for Walmart in updated representation 140, that Target and H-E-B are similar and thus return a response to application 500 that indicates them as similar items.

In some embodiments, different applications 500 have different levels of strictness for similarity and thus different distance thresholds can be used to determine similarity between items. The threshold used for selecting the similar items may be identified in the application's request for similar items. As an example, if a request identifies Walmart and a large threshold distance, then Amazon may be included as similar item; however, a smaller threshold distance may exclude it. Further, an item number threshold instead of a distance threshold may be used. As an example, if application 500 requests three similar items, then platform system 110 may return a response that identifies Walmart, Target, and H-E-B as similar items.

Figure 6:
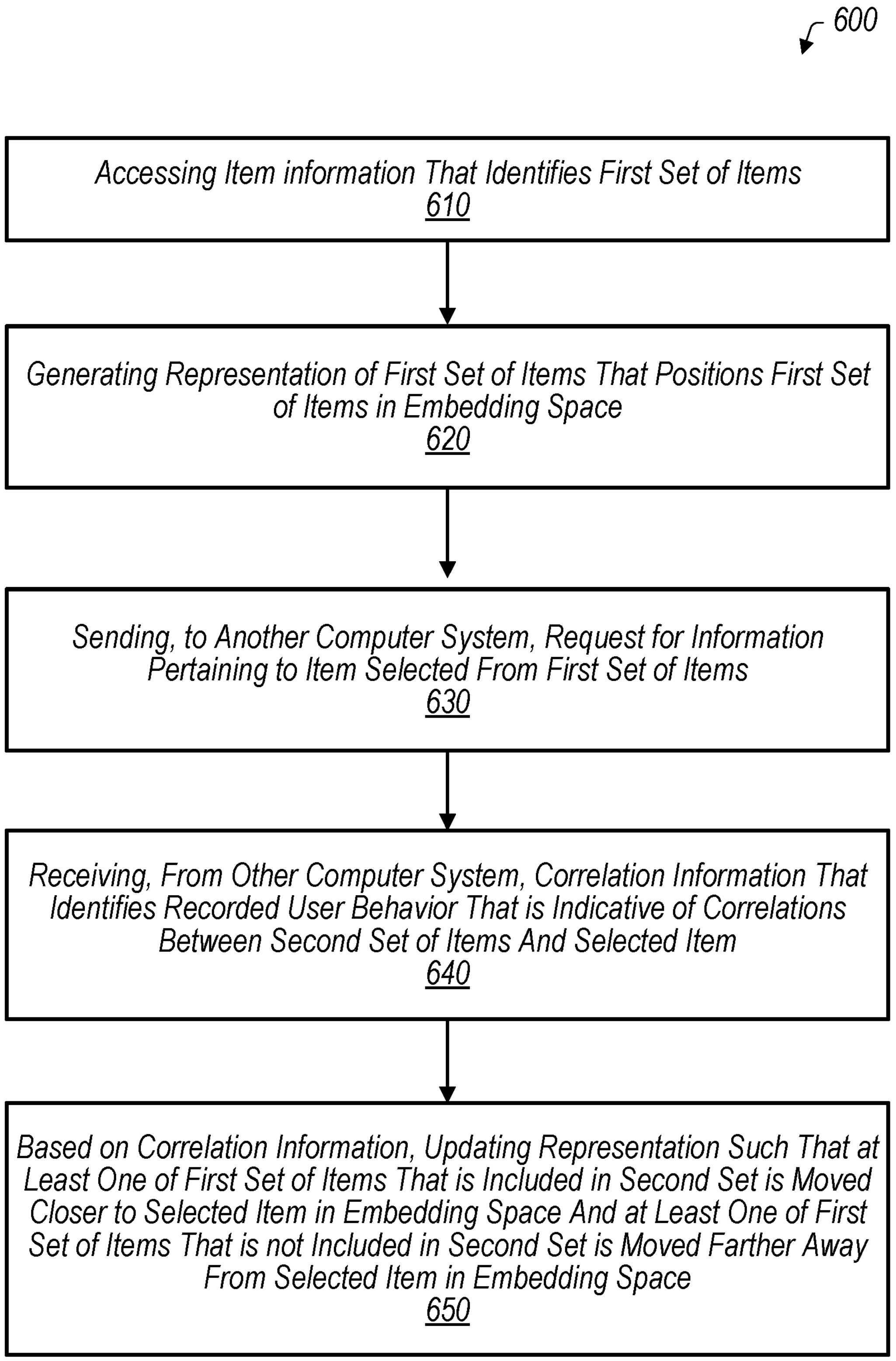
FIG. 6 is a flow diagram illustrating example method relating to generating and updating an item representation, according to some embodiments.

Turning now to FIG. 6, a flow diagram of a method 600 is shown. Method 600 is one embodiment of a method that is performed by a computer system (e.g., platform system 110) to generate and update an item representation. Method 600 might be performed by executing a set of program instructions stored on a non-transitory computer-readable medium. In some embodiments, method 600 includes more or less steps than shown. For example, method 600 may include a step in which a set of similar items are identified from the updated representation (e.g., updated representation 140).

Method 600 begins in step 610 with the computer system (e.g., platform system 110) accessing item information that identifies a first set of items. The items in question may be, for example, merchants, restaurants, historical sites, websites, or marathons. The computer system may access the item information in different ways. In some embodiments, item information is stored locally to the computer system (e.g., the computer system's memory or a database that is managed by the computer system). But in other embodiments, the item information is stored by a third-party entity and accessed using a network connection.

In step 620, the computer system generates a representation of the first set of items (e.g., initial representation 130) that positions the first set of items in an embedding space (e.g., embedding space 230). Since machine learning models may be useful in embedding the first set of items as a set of initial embeddings, the representation may be generated using a machine learning model (e.g., embedding model 220) to embed the first set of items into the embedding space. In some embodiments, the embedding space is a vector space. In the absence of existing information regarding the first set of items, the generated representation may have the first set of positioned randomly in the embedding space. Alternatively, having non-random positions within the embedding space could improve the updating process as those non-random starting positions may be closer to the updated positions than random positions. Accordingly, in some embodiments, the representation is generated based on categorical data (e.g., categorical item information 135) that describes properties of one of the first set of items that is not based on user behavior.

In step 630, the computer system sends, to another computer system (e.g., oracle system 150), a request for information pertaining to an item selected from the first set of items. In step 640, the computer system receives, from the other computer system, correlation information (e.g., item correlation information 155) that identifies recorded user behavior that is indicative of correlations between a second set of items and the selected item. The other computer system may correspond to any service that generates information that describes or is indicative of user behavior. For example, the recorded user behavior may correspond to web searches (e.g., user search input 310A) that are performed by a set of users with respect to the second set of items and the selected item. The second set of items may include at least one item that is not included in the first set of items (e.g., item embedding 235E). In some cases, the computer system may update the representation to embed the item into the embedding space. In some embodiments, multiple systems (e.g., oracle systems 150) are queried to obtain correlation information that is used to update the representation. As a part of step 640, the computer system may receive, from another computer system, additional correlation information indicative of correlations between a third set of items and the selected item. The third set of items may include at least one item that is not included in the second set of items.

In step 650, the computer system updates the representation based on the correlation information such that at least one of the first set of items that is included in second set is moved closer to selected item in the embedding space and at least one of first set of items that is not included in second set is moved farther away from that selected item in embedding space. The updated representation can be used to provide users with information relating to similar items. The computer system may, based on the updated representation, identify a subset of the first set of items that are indicated as being similar based on their positions in the embedding space satisfying a distance threshold (e.g., two or more items are within a certain distance of each other). For example, the updated representation for a set of merchants may be used to output all merchants that are sufficiently similar to each other, such as all sports retailers in a certain geographical area. Additional updates may be desired for more accurate item representations and thus the computer system may update the representation in multiple iterations. As such, the updating of the representation may be one of multiple iterations in which ones of the second set of items are moved closer to the selected item and ones of the first set of items not in the second set are moved farther away from the selected item.

Exemplary Computer System

Figure 7:
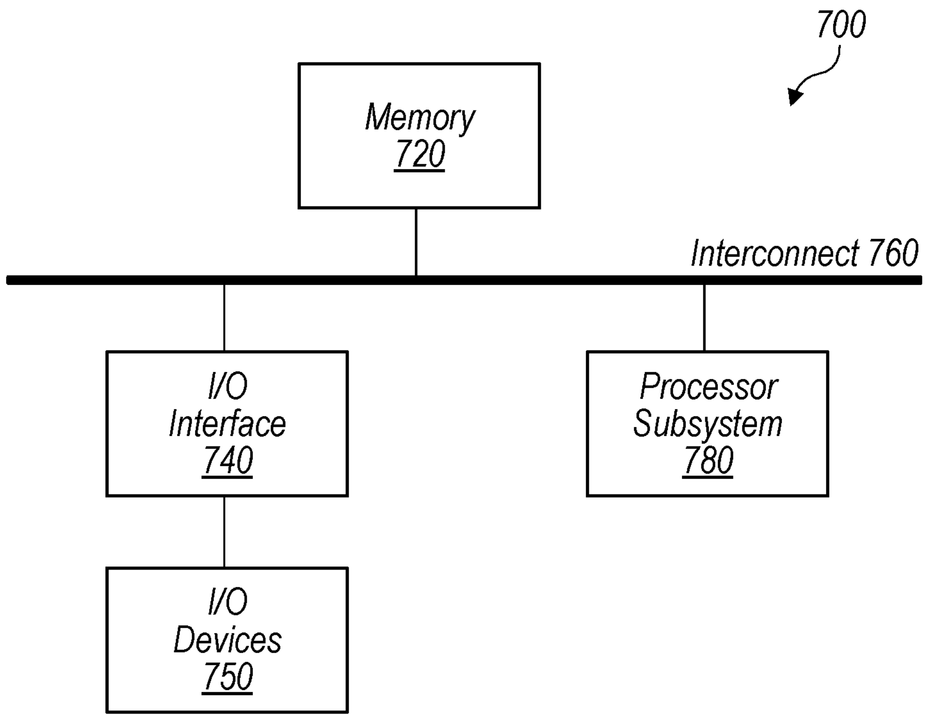
FIG. 7 is a block diagram illustrating elements of a computer system for implementing various systems described in the present disclosure, according to some embodiments.

Turning now to FIG. 7, a block diagram of an exemplary computer system 700, which may implement system 100, platform system 110, and/or oracle system 150, is depicted. Computer system 700 includes a processor subsystem 780 that is coupled to a system memory 720 and I/O interfaces(s)

740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement embedding engine 120 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

accessing, by a first computer system, item information that identifies a first set of items;

performing, by the first computer system, an initial embedding operation using a machine learning model and categorical data about the first set of items to generate an initial representation of the first set of items that positions the first set of items in an embedding space as embeddings;

sending, by the first computer system and to a second computer system that processes user search queries, a request for information pertaining to an item selected from the first set of items;

receiving, by the first computer system and from the second computer system, correlation information identifying recorded user behavior indicative of correlations between a second set of items and the selected item, wherein the recorded user behavior is based on the user search queries;

based on the correlation information, the first computer system generating an updated version of the initial representation, wherein the generating includes performing multiple iterations in which different ones of the second set of items are selected for processing, and wherein a given iteration of the multiple iterations includes:

selecting a first item from the second set of items;

selecting a second item from the first set of items that is not included in the second set of items;

decreasing a distance between an embedding of the first item and an embedding of the selected item in the embedding space;

increasing a distance between an embedding of the second item and the embedding of the selected item in the embedding space; and generating, by the first computer system based on the updated version, a recommendation based on two or more items of the first set of items being indicated as similar based on embeddings of the two or more items being positioned within a proximity threshold in the embedding space.

2. The method of claim 1, wherein the embedding space is a vector space, and wherein the machine learning model embeds the first set of items into the vector space as vectors embeddings.

3. The method of claim 1, wherein the recorded user behavior corresponds to web searches that are performed by a set of users with respect to the second set of items and the selected item.

4. The method of claim 1, wherein the second set of items includes at least one item that is not included in the first set of items.

5. The method of claim 1, wherein the second computer system implements a search engine that derives the recorded user behavior based on user interactions with the search engine.

6. The method of claim 1, further comprising:

implementing, by the first computer system, one or more services that pertain to the first set of items, wherein the categorical data is stored by the first computer system as a part of providing the one or more services.

7. The method of claim 1, wherein the generating of the updated version of the initial representation includes performing multiple iterations in which embeddings of a third set of items and an embedding of a second selected item selected from the first set of items are moved closer in the embedding space and embeddings of ones of the first set of items not included in the third set and the embedding of the second selected item are moved farther away from each other in the embedding space.

8. The method of claim 1, wherein the correlation information identifies a particular item that is not included in the first set of items, and wherein the generating of the updated version of the initial representation includes embedding the particular item into the embedding space.

9. A non-transitory computer-readable medium having program instructions stored thereon that are executable to cause a first computer system to perform operations comprising:

accessing item information that identifies a set of items;

generating, based on categorical data about the set of items, an initial representation of the set of items that positions the set of items in an embedding space as embeddings;

obtaining correlation information for at least two items of the set of items, wherein the correlation information is based on recorded user behavior and identifies, for a particular one of the at least two items, one or more similar items to that particular item, and wherein the recorded user behavior is based on a monitoring of a set of user interactions that includes search queries issued by a set of users in connection with the particular item and the one or more similar items; and generating, based on the correlation information, an updated version of the initial representation that decreases a distance between an embedding of at least one of the set of items that is included in the one or more similar items and an embedding of the particular item in the embedding space and increases a distance between an embedding of at least one of the set of items that is not included in the one or more similar items and the embedding of the particular item in the embedding space; and generating, based on the updated version, a recommendation based on two or more items of the set of items being indicated as similar based on embeddings of the two or more items being positioned within a proximity threshold in the embedding space.

10. The medium of claim 9, wherein the generating of the initial representation is performed using a machine learning model that embeds the set of items in the embedding space based on the categorical data.

11. The medium of claim 9, wherein the correlation information identifies an item that is not included in the set of items, and wherein the generating of the updated version of the initial representation includes embedding the item into the embedding space.

12. The medium of claim 9, wherein the recorded user behavior is based on Global Positioning System (GPS) data collected by a second computer system for particular users.

13. A system, comprising:

at least one processor; and a memory having program instructions stored thereon that are executable by the at least one processor to perform operations comprising:

accessing item information that identifies a first set of items;

performing an initial embedding of the first set of items into a vector space as a set of embeddings based on categorical data collected about the first set of items;

sending a request to a different system for information relating to an item selected from the first set of items;

receiving, from the different system, correlation information that identifies recorded user behavior that is indicative of correlations between a second set of items and the selected item; and based on the correlation information, modifying a particular one of the set of embeddings that corresponds to the selected item such that the particular embedding is moved closer in the vector space to ones of the set of embeddings that correspond to the second set of item and farther away from ones of the set of embeddings that correspond to those ones of the first set of items that are not included in the second set of items; and producing a recommendation based on two or more items of the first set of items being indicated as similar based on embeddings of the two or more items being positioned within a proximity threshold in the vector space.

14. The system of claim 13, wherein the initial embedding of the first set of items is performed using a machine learning model that produces the set of embeddings based on categorical data collected about the first set of items.

15. The system of claim 13, wherein the operations further comprise:

embedding, into the vector space, at least one item of the second set of items that is not included in the first set of items.

16. The system of claim 13, wherein the first set of items are positioned randomly in the vector space as a part of performing the initial embedding.

* * * * *